(12) United States Patent
Looney (10) Patent No.: US 7,726,904 B2
(45) Date of Patent: Jun. 1, 2010

(54) MOBILE CONVEYING APPARATUS HAVING A GEAR-TO-GEAR DRIVEN SWING ASSEMBLY

(75) Inventor: David Looney, Monroe, OR (US)

(73) Assignee: Rexius Forest By-Products, Inc., Eugene, OR (US)

( * ) Notice: Subject to any disclaimer, the term of this patent is extended or adjusted under 35 U.S.C. 154(b) by 658 days.

(21) Appl. No.: 11/625,741

(22) Filed: Jan. 22, 2007

(65) Prior Publication Data

US 2008/0175666 A1 Jul. 24, 2008

(51) Int. Cl.
*E01C 19/18* (2006.01)
(52) U.S. Cl. ........................................ 404/110; 404/108
(58) Field of Classification Search .................. 404/108, 404/110; 198/314, 312, 315, 317, 642, 835, 198/837; 239/650, 651; 414/482, 497
See application file for complete search history.

(56) References Cited

U.S. PATENT DOCUMENTS

| | | | | | |
|---|---|---|---|---|---|
| 1,560,203 | A | * | 11/1925 | Carey | 198/608 |
| 2,066,137 | A | * | 12/1936 | Cartlidge | 198/516 |
| 2,579,025 | A | * | 12/1951 | Donselaar | 37/368 |
| 3,051,298 | A | * | 8/1962 | Knight | 198/834 |
| 3,075,813 | A | * | 1/1963 | Vohl | 406/158 |
| 3,412,943 | A | * | 11/1968 | Lewis et al. | 239/651 |
| 3,520,434 | A | | 7/1970 | Destefan et al. | |
| 3,760,517 | A | * | 9/1973 | Blaauw | 37/260 |
| 3,850,283 | A | * | 11/1974 | Nordstrom | 198/313 |
| 3,963,138 | A | | 6/1976 | Fowler | |
| 4,023,689 | A | * | 5/1977 | Taylor et al. | 414/327 |
| 4,368,813 | A | * | 1/1983 | Mailliet | 193/3 |
| 4,944,630 | A | * | 7/1990 | Brock et al. | 404/83 |
| 5,529,434 | A | * | 6/1996 | Swisher, Jr. | 404/108 |
| 5,888,044 | A | * | 3/1999 | Baskerville | 414/523 |
| 6,058,629 | A | * | 5/2000 | Peterson et al. | 37/261 |
| 6,464,426 | B1 | * | 10/2002 | Girouard | 404/101 |
| 6,776,557 | B2 | * | 8/2004 | Barnat et al. | 404/101 |
| 6,805,516 | B2 | * | 10/2004 | Barnat et al. | 404/101 |
| 6,845,859 | B2 | * | 1/2005 | Grundl | 198/314 |
| 7,160,056 | B1 | * | 1/2007 | Hoffmann et al. | 404/109 |
| 7,201,536 | B1 | * | 4/2007 | Westbrook et al. | 404/108 |
| 2002/0121430 | A1 | * | 9/2002 | Grundl | 198/866 |
| 2006/0239806 | A1 | * | 10/2006 | Yelton | 414/502 |

OTHER PUBLICATIONS

Series WE-LA; IMO; pp. 6-7, 32-33, and 52-53.
Non-Final Office Action dated Sep. 17, 2008 for U.S. Appl. No. 11/625,747.
Non-Final Office Action dated Jun. 8, 2009 for U.S. Appl. No. 11/625,747.
Non-Final Office Action dated Oct. 26, 2009 for U.S. Appl. No. 11/625,747.

* cited by examiner

*Primary Examiner*—Thomas B Will
*Assistant Examiner*—Abigail A Risic
(74) *Attorney, Agent, or Firm*—K&L Gates LLP (57) ABSTRACT

An mobile material placer or slinger with a placer conveyor having a gear-to-gear pivoting mechanism. The mobile material placer includes a body, a material hopper coupled to the body and configured to receive and store material, a feeder conveyor coupled to the body, and a placer conveyor pivotally coupled to the body about a vertical axis. The gear-to-gear pivoting mechanism includes a first gear attached to the body of the material placer and that drives a second gear fixedly mounted to the placer conveyor.

18 Claims, 8 Drawing Sheets

MOBILE CONVEYING APPARATUS HAVING A GEAR-TO-GEAR DRIVEN SWING ASSEMBLY

BACKGROUND

It is well known that many tasks such as: the construction of driveways, roadways, and asphalt surfaces; the back filling of retaining walls; and the distribution of aggregate, mulch, soil and the like, can be extremely labor intensive. For example, delivery of aggregate to a roadway construction site typically involves: (i) loading a dump truck at an aggregate storage facility, (ii) transporting the aggregate to the construction site, (iii) dumping the aggregate in a mound, (iv) manually filling a wheelbarrow, (v) wheeling the aggregate to a selected location, and (iv) dumping the wheelbarrow load at that location. Each of these steps involves a great deal of time and labor. Furthermore, at each of these steps material may be spilled, wasted or otherwise strewn about the construction site. This waste results in an unsightly and potentially environmentally hazardous construction site and can create a potential road hazard if gravel material is picked up by the tires of passing vehicles and thrown into the air. This picked-up material can injure unprotected pedestrians or damage property such as the windshields of passing vehicles.

To address the inefficiencies inherent in these steps, a number of mobile placers have been designed. Certain of these known mobile placers include a placer or placing conveyor pivotally attached to the main body of the vehicle. Placing conveyors generally include a conveyor belt driven around a number of rollers and function to convey and direct material from a material source to a worksite.

Certain known placer conveyors use a placer conveyor that is pivotally attached to the main body of the vehicle. Typically, the mechanism for attaching the placer conveyor to the main body includes a vertical pivoting axis located near the in-feed end of the placer conveyor. With this configuration, the placer conveyor can swing side-to-side about the vertical axis. This allows the operator to dispense material in a variety of different directions or angles relative to the vehicle.

Different driving mechanisms have been developed to accomplish side-to-side pivoting of a placer conveyor relative to the vehicle body. In one example, a flange is provided around the vertical pivoting axis and one or more hydraulic piston-cylinder apparatuses are coupled to a peripheral portion of the flange. As the cylinder extends and contracts, the placer conveyor is pivoted about the vertical axis. In another example, a sprocket is provided about the vertical axis and is driven by a chain. However, the accuracy of the side-to-side pivoting motion of the placer conveyors using these drive systems is not sufficient to precisely direct material to a specific location on a worksite.

It would be advantageous to provide a system, apparatus and/or method that addresses these limitations and simplifies the process of constructing and/or maintaining a roadway or distributing material around a construction site.

SUMMARY

In an embodiment, a mobile material placer or slinger is provided that includes a body, a material hopper coupled to the body, and which is configured to receive and store material, a feeder conveyor coupled to the body, the feeder conveyor configured to receive material stored by the material hopper, and a placer conveyor pivotally coupled to the body about a substantially vertical axis. The placer conveyor has an in-feed end and a discharge end, the in-feed end alignable with a discharge end of the feeder conveyor. The placer conveyor includes a drive mechanism adapted to pivot the placer conveyor about the vertical axis. The drive mechanism includes a first gear and a second gear fixedly mounted to the placer conveyor. The first gear is operatively coupled with the second gear to cause the placer conveyor to pivot about the vertical axis.

In an embodiment, the first gear is a worm screw and the second gear is a worm wheel. In an embodiment, the worm screw rotates about a substantially horizontal axis and the worm wheel rotates about a substantially vertical axis.

In an embodiment, the worm screw is hydraulically driven. In another embodiment, the worm screw is electrically driven.

In an embodiment, the placer conveyor includes a high-speed hydraulic drive motor and is configured to rapidly dispense material to a worksite.

In an embodiment, the mobile material placer further includes a remote control system configured to control at least the operation of the feeder conveyor, the speed of the placer conveyor, and the lateral pivoting of the placer conveyor.

In another embodiment, the mobile material placer is directly controlled by an operator.

In an embodiment, the placer conveyor is also pivotally coupled to the body about a horizontal axis, such that the placer conveyor can be pivoted in a vertical direction.

Additional features and advantages are described herein, and will be apparent from, the following Detailed Description and the figures.

DETAILED DESCRIPTION

In general, a mobile material placer constructed according to the teachings of the present disclosure includes a body coupled to a frame, a material hopper attached to the body, a primary conveyor coupled to the body, where the primary conveyor is adapted to receive material from the material hopper. A placer conveyer is pivotally coupled to the body and adjustable side-to-side and up and down relative to the body. The placer conveyor is adapted to receive material from the primary conveyor and rapidly discharge material to a worksite. Accordingly, the material placers according to the present embodiments are able to rapidly direct and project material such as, for example, aggregate, across a job site to any desired location that may not be accessible to the mobile placer, while also having the ability to simultaneously operate in a mobile fashion.

I. Mobile Placer

Figure 1:
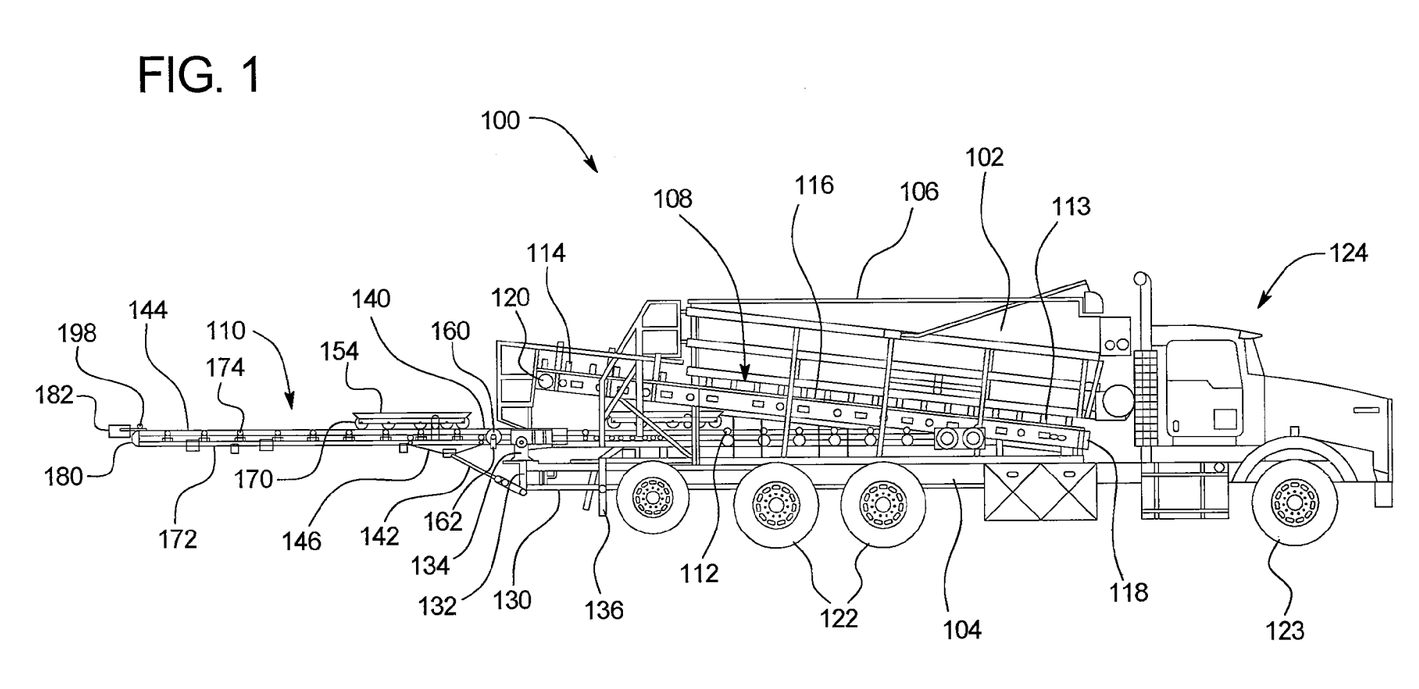
FIG. 1 is a side view of a mobile placer with a placing conveyor.
Figure 2:
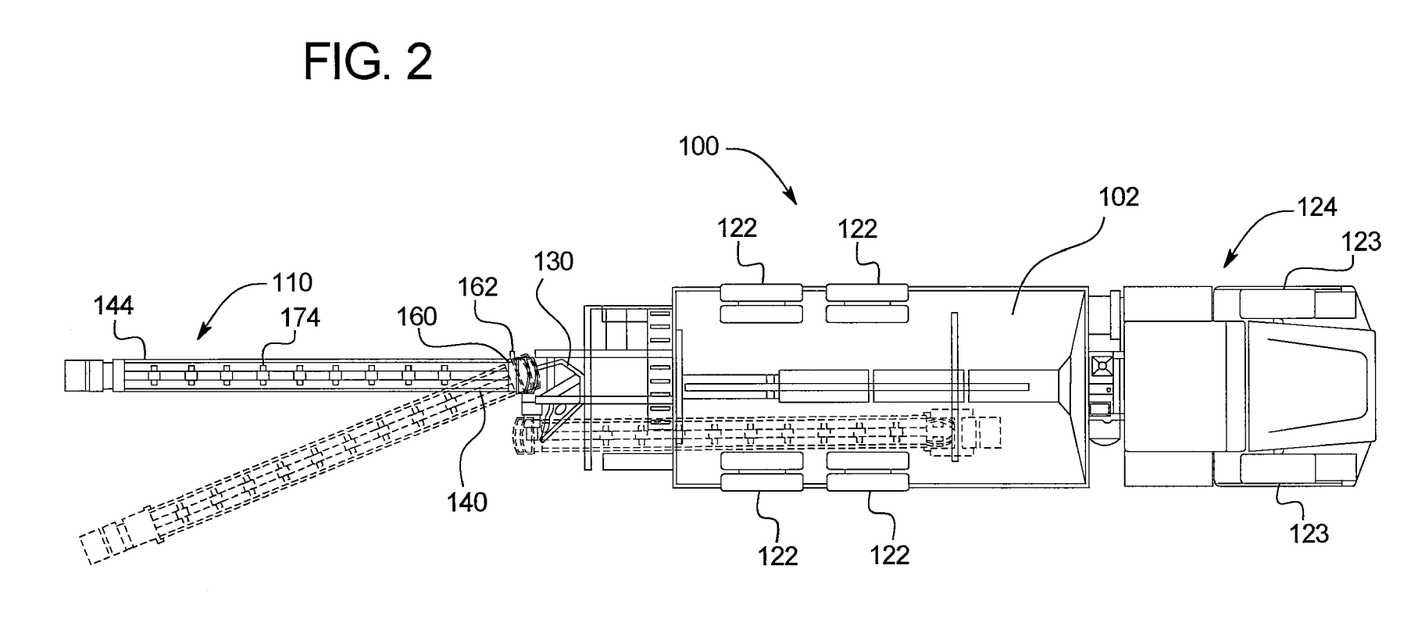
FIG. 2 is a top view of a mobile placer with a placing conveyor.
Figure 4:
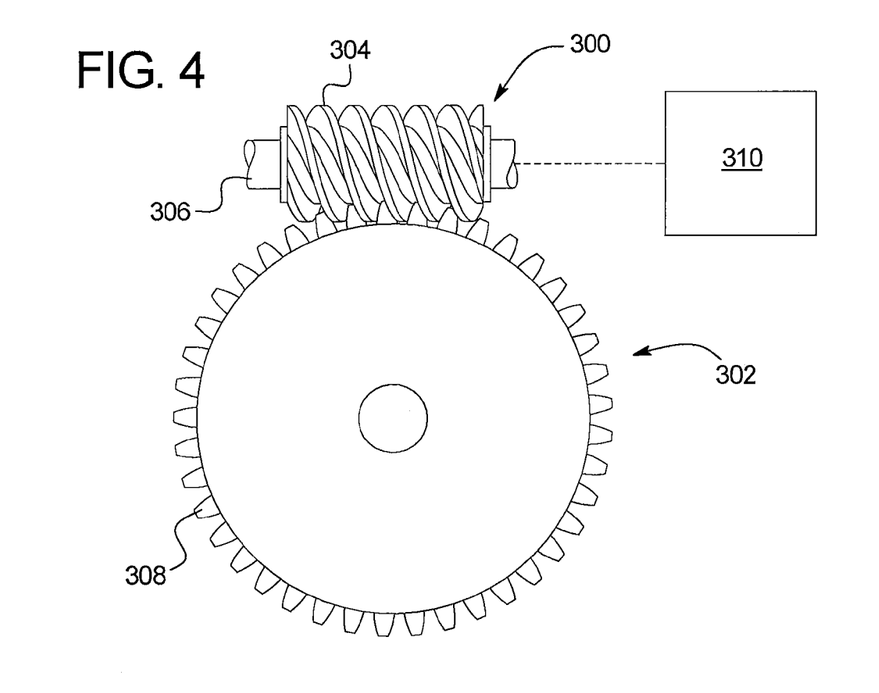
FIG. 4 is a side view of a gear-to-gear drive mechanism for pivoting the placer conveyor in a lateral direction.
Figure 5:
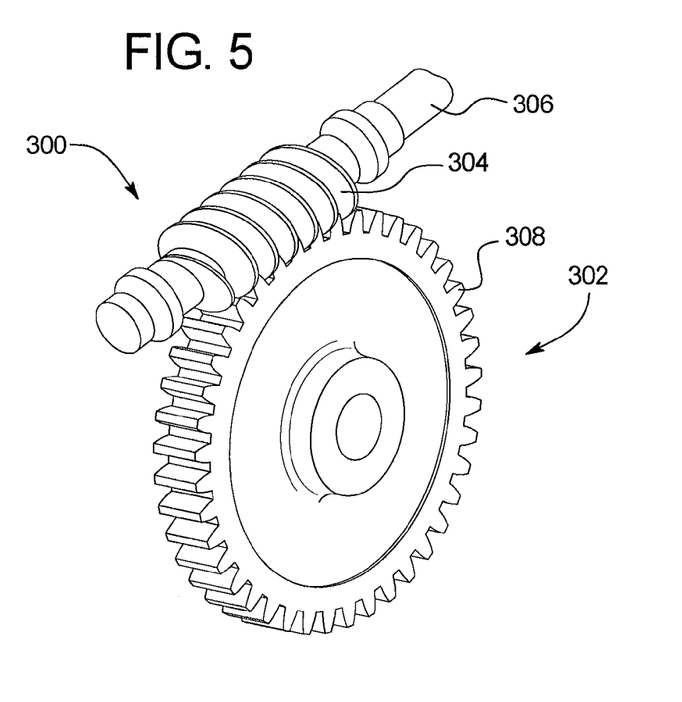
FIG. 5 is a perspective view of a gear-to-gear drive mechanism for pivoting the placer conveyor in a lateral direction.
Figure 6:
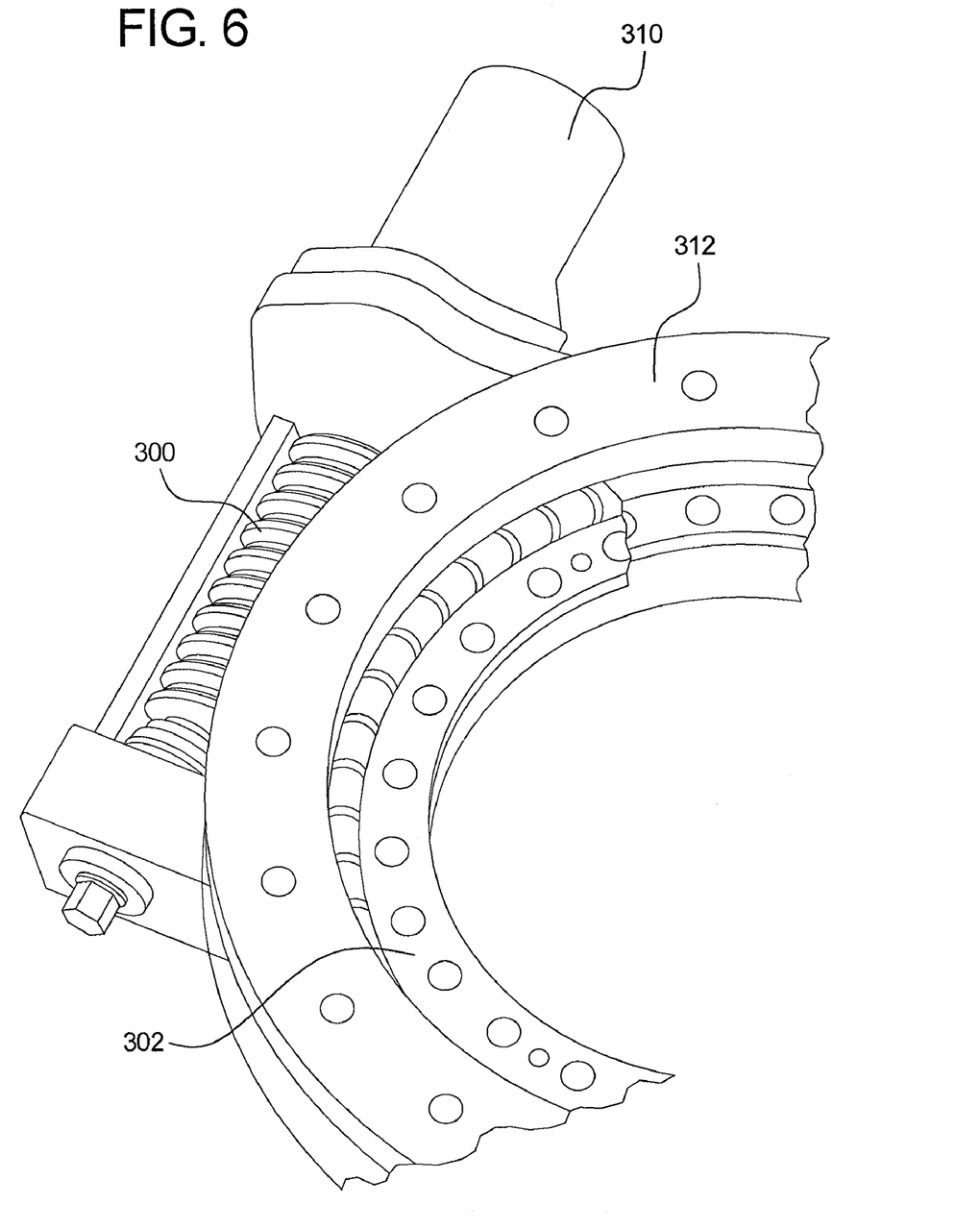
FIG. 6 is a partial perspective view of a gear-to-gear drive mechanism for pivoting the placer conveyor in a lateral direction.

Turning to the figures, FIGS. 1 and 2 illustrate an example of a mobile placer 100 or slinger according to one embodiment, where the mobile placer 100 is configured to operate on a truck chassis and includes an operator cab 124. The mobile placer 100, according to this embodiment, includes a body 102 coupled to and carried by a frame 104, a material hopper 106 integrally mounted to the frame 104, a primary conveyor 108, and a high-speed placing or placer conveyor 110 pivotally mounted to the frame 104. As described in further detail below, the placer conveyor 110 is driven by a high-speed direct drive hydraulic motor 162 (see, FIG. 4). It should be appreciated that in other embodiments, the mobile placer does not have a cab and must be driven remotely by an operator.

In this embodiment, the slinger or mobile placer 100 is configured to operate on a truck chassis such as, for example, a KENWORTH® T-800 premium truck chassis. It should be appreciated that any suitable chassis may be used. In this exemplary embodiment, the mobile placer 100 is mounted to a truck frame 104, which includes, for example, a SPICER® EFA twenty-thousand pound (lb) front axel and a SPICER® DSH forty-thousand pound (lb) rear axel. However, any suitable frame and axel may be used. Mounted to the rear axel is at least one set of rear tires 122, and mounted to the front axel is one set of front tires 123. The mobile placer 100 also includes a truck cab 124, an engine (not shown), and a drive train 112. In one example, the engine may be a CATERPILLAR® C-13 engine with four hundred-thirty horsepower (hp) and sixteen-hundred and fifty lb-ft of torque, or a CATERPILLAR® model 3054C 86HPTM Tier 2 compliant engine. However, it should be appreciated that the engine may be any other suitable engine. The engine enables the mobile placer 100 to move in a forward or reverse direction, and to steer the mobile placer 100 to a desired location.

In operation, the material to be conveyed or dispensed is loaded into the material hopper 102 by, for example, a backhow, skid steer or an excavator, and is gravity fed onto a first end 114 of the primary conveyor 108. The material hopper 106 may be constructed of a high tensile steel such as ten gauge sheeting that rates for a load capacity of at least six cubic meters. It will be understood that the material hopper 106 could be constructed of any suitable material and may include a larger load capacity depending on the applications and requirements placed upon the equipment. The hopper 106 may further include one or more hopper extensions (not shown) that increase or extend the width of the hopper opening to facilitate loading and to increase load capacity. The hopper 106 may include a vibratory agitator with a timer to facilitate the transport of material from the hopper 106 down to the primary conveyor 108. In other exemplary embodiments, the hopper 106 may be spring mounted to the frame 104, and/or may include exterior mounted skirt adjustments (not shown).

In an embodiment, the primary conveyor 108 includes a primary conveyor belt 116 that can, for example, be driven by a hydraulic drive mechanism (not shown). The primary conveyor belt 116 travels around a primary conveyor head roller 120 and a primary conveyor tail roller 118. The primary conveyor belt 116 is further supported by several sets of troughing rollers (not shown). In one example, the primary conveyor belt 116 may be an eighteen inch wide two-ply troughing belt. In one embodiment, the primary conveyor belt 116 may have any number of cleats to help convey the material. It should be appreciated that any suitable type of primary conveyor belt 116 having any suitable width may be used.

In one embodiment, the primary conveyor 108 is a positive start cartridge type with a non-troughing conveyor belt. In this embodiment, the track of the primary conveyor 108 is at least twenty inches wide to accommodate a larger variety of materials through the bottom opening in the material hopper 106. The cartridge type primary conveyor may be manufactured as a self-contained unit and may slide into the body 102 of the mobile placer 100. The cartridge type primary conveyor may be slid out of the body 102 at any time for repair or replacement. In another embodiment, the cartridge type primary conveyor is cleated as discussed above.

In another embodiment, the primary conveyor 108 is chain driven and includes a plurality of chain links mounted around a gear and connected to form a continuous chain (not shown). In one embodiment, the primary conveyor 108 includes a conveyor mount, a drive assembly and a primary conveyor belt 116. In one example, the conveyor mount is mounted to the frame 104 of the mobile placer 100. The drive assembly is mounted to the conveyor mount. In one embodiment, the drive assembly includes a set of gears (not shown) having teeth that engage the chains links and drive the chains in a particular direction.

Referring to FIG. 1, the head roller 118, the tail roller 120, the troughing rollers, and the primary conveyor belt 116 facilitate the conveyance of material through an incline from an in-feed end 113 of the primary conveyor 108 to a discharge end 114 of the primary conveyor 108. If, for example, troughing rollers are to be used in an application, several sets of troughing rollers may be arranged along the length of the primary conveyor 108 to help support the weight of the material being conveyed. Moreover, additional sets of troughing rollers may be positioned near the in-feed end 114 of the primary conveyor 108. In this embodiment, the greater number of troughing rollers at the in-feed end 114 of the primary conveyor 108 help support the greater mass of material contained in the material hopper 106 at that position. In one embodiment, the primary conveyor 108 includes one or more skirts and one or more primary conveyor skirt supports. After the material has been conveyed to the discharge end 114 of the primary conveyor 108, the material is discharged onto the placing or placer conveyor 110, as described in further detail below.

In an embodiment, the mobile placer 100 does not include a cab and is operated entirely by a remote control, such as the HETRONIC™ radio remote control. The remote control can be configured with separate controls for operating the primary conveyor 108 and the placer conveyor 110. The remote control also includes one or more controls to enable the entire mobile placer 100 to move forward and reverse and to be steered in different directions. Additionally, the remote control includes one or more controls to enable the placer conveyor 110 to pivot from side-to-side and tilt up and down.

In another embodiment, the mobile placer 100 includes a four-wheel steering system to facilitate maneuvering in relatively confined areas. In this embodiment, the front and real axles may, for example, be twenty thousand pound crab steering axles or any other type suitable axle. The wheels may be 15"×19.5" flotation tires. However, it should be appreciated that any suitable tires may be used that accommodate travel over relatively rough terrain. The front wheels 123 may pivot independently of the rear wheels 122, or either the front 123 or rear 122 wheels may pivot while other wheels do not.

In one embodiment, the mobile placer includes an additional feeder conveyor that feeds material from a separate feed hopper (not shown) into the main material hopper 106.

II. Placer Conveyor Having A Gear-To-Gear Pivoting Drive

Generally, the placer conveyor functions in a similar manner as does the primary conveyor, discussed above with reference to FIG. 1. As mentioned above, the primary conveyor conveys material that is gravity fed from the hopper through an incline and then discharges the material onto an in-feed end of the placer conveyor. In general, the placer conveyor includes at least the following elements: (a) a frame; (b) a plurality of axles rotatably mounted to the frame, each axle having at least one roller coupled to the axle; (c) an endless belt driven around the rollers; and (d) a drive mechanism operatively coupled to one of the axles to drive the endless belt around the rollers.

Figure 3:
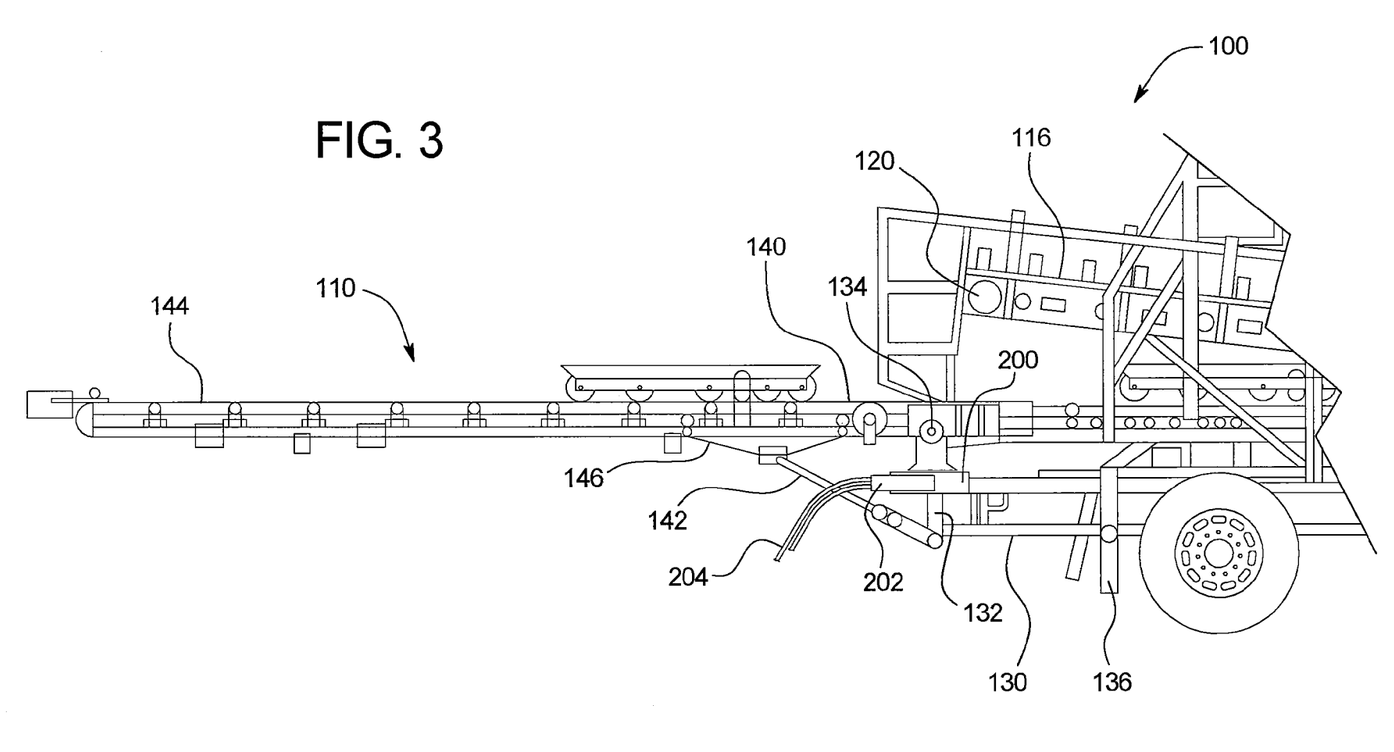
FIG. 3 is a partial side view of a mobile placer with a placing conveyor, and including a gear-to-gear mechanism for pivoting the placer conveyor having a direct hydraulic drive mounted at the material in-feed end of the placer conveyor.

Referring to FIG. 3, in an embodiment, the placer conveyor 110 mounts to the body 102 of the mobile placer 100 via a swing arm assembly 130. The swing arm assembly 130 includes a swing arm hinge 132 mounted to define a substantially vertical axis, a swing arm yoke 134 mounted to define a substantially horizontal axis, and a swing arm mounting bumper 136 coupled thereto. The placer conveyor 110 pivotally mounts to the swing arm yoke 134 at an in-feed end 140 of the placer conveyor 110. A conveyor lift cylinder 142 further supports a discharge end 144 of the placer conveyor 110. The placing conveyor lift cylinder 142 couples to the swing arm assembly 130 and mounts to the placer conveyor 110 via a placer conveyor upper cylinder mount 146.

The swing arm hinge 132 allows the placer conveyor 110 to rotate about the vertical pivot axis defined by the centerline of the swing arm hinge 132. The placer conveyor 110 may therefore rotate in a clockwise or counterclockwise direction, relative to the swing arm hinge 132, to convey and dispense material in an arc around the mobile placer 100. Similarly, the placer conveyor lift cylinder 142 elevates or lowers the placer conveyor 110 relative to a horizontal pivot axis defined along the swing arm yoke 134. It will be understood that alternate arrangements of pivot points, hinges, or ball joints may be employed to allow the placer conveyor 110 to move in both lateral and vertical directions.

In an embodiment, a drive mechanism is mounted to the swing arm hinge 132 to cause the clockwise and counterclockwise pivotal rotation (i.e., movement is the lateral direction) of the placer conveyor 110 relative to the mobile placer 100. The drive mechanism includes a first gear 202 operatively coupled to a second gear 200, where the first gear is hydraulically, electrically, or pneumatically driven. Each of the first gear 202 and the second gear 200 includes a plurality of gear teeth or toothed drive elements. As the first gear 202 and the second gear 200 rotate, the gear teeth from the first gear 202 mesh or mate with the gear teeth from the second gear 200. Preferably, the first gear 202 and the second gear 200 are manufactured with sufficient dimensional tolerances such that a precisely controlled rotation of the placer conveyor 110 can be achieved. That is, an operator that is operating the mobile placer 100 from either a cab located on the vehicle or with a remote control system is able to rotate the placer conveyor 110 back and forth to accurately place material at a desired location.

In one embodiment, the first gear 202 is positionally and rotationally fixed with respect to the main body 102 of the mobile placer 100, and the second gear 200 is rotationally fixed with respect to the placer conveyor 110. That is, the first gear 202 causes the second gear 200 to rotate, thus causing the placer conveyor 110 to pivot back and for the with respect to the mobile placer 110. It should be appreciated that the first gear 202 and the second gear 200 may be any suitable gear combination sufficient to cause the placer conveyor 110 to pivot back and forth.

In the example of FIGS. 4 to 8, the drive mechanism is a worm drive including a worm screw 300 operatively coupled to a large diameter worm ring or worm wheel 302. The worm screw 300 includes a drive shaft 306 driven by a hydraulic or electric drive 310. Formed about the drive shaft 306 are a plurality of teeth 304. The worm wheel 302 also includes a plurality of teeth 308 on the periphery of the worm wheel 302. The teeth 306 of the worm screw 300 mesh or mate with some of the teeth 308 of the worm wheel 302. The worm is similar to a screw and the worm wheel is similar to a section of a nut. As the worm screw 300 is rotated the worm wheel 302 is caused to rotate due to the screw-like action of the worm screw 300. The diameter of the drive shaft 306 of the worm screw 300 and the diameter of the worm wheel 302 are selected to achieve a desired gear reduction ratio between the worm screw 300 and the worm wheel 302. The gear reduction ratio allows a sufficient torque to be applied to the worm wheel 302 to be able to pivot the full mass of the placer conveyor 110.

Figure 7:
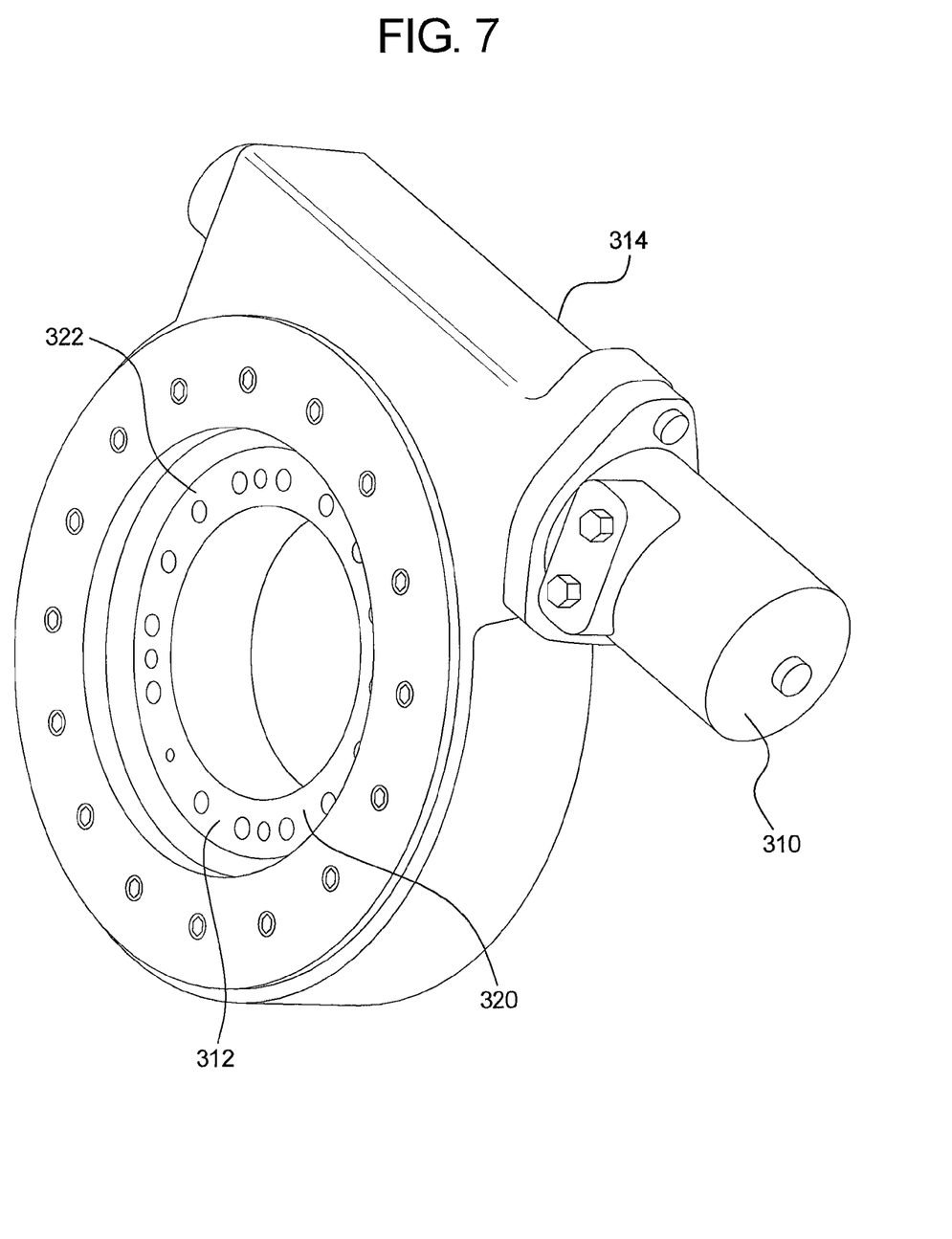
FIG. 7 is a perspective view of a gear-to-gear drive mechanism for pivoting the placer conveyor in a lateral direction.
Figure 8:
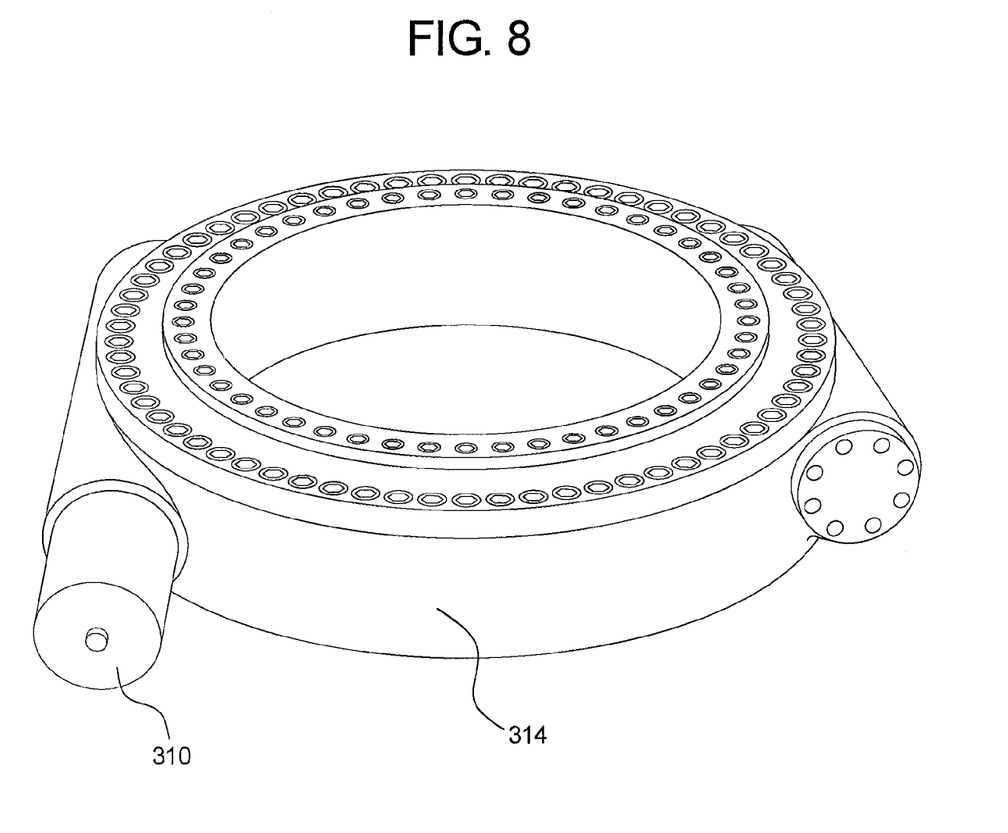
FIG. 8 is a perspective view of another gear-to-gear drive mechanism for pivoting the placer conveyor in a lateral direction.

Referring to FIG. 7, in an embodiment, the worm wheel 300 is provided in a housing 312 and the worm screw 300 is provided in a separate housing 314. In an embodiment, the housing 314 and the worm screw 300 do not rotate with respect to the body 102 of the mobile placer 100. However, the worm wheel 302 and housing 312 rotate with respect to the worm screw 300 and the mobile placer 100. The housing 312 of the worm wheel 302 includes a bracket or flange 320 having a plurality holes 322 for attaching the worm wheel 302 to the placer conveyer 110.

In operation, in an example where the drive 310 is a hydraulic drive, hydraulic fluid is pumped by a hydraulic pump (not shown) into an inlet port 204 (see, FIG. 3) of the drive 300. The hydraulic drive 300 causes the shaft 306 of the worm screw 300 to rotate, thus causing the worm wheel 302 to rotate. Because the worm wheel 302 is fixedly attached to the placer conveyor 110, the placer conveyor likewise pivots laterally back and forth.

Figure 9:
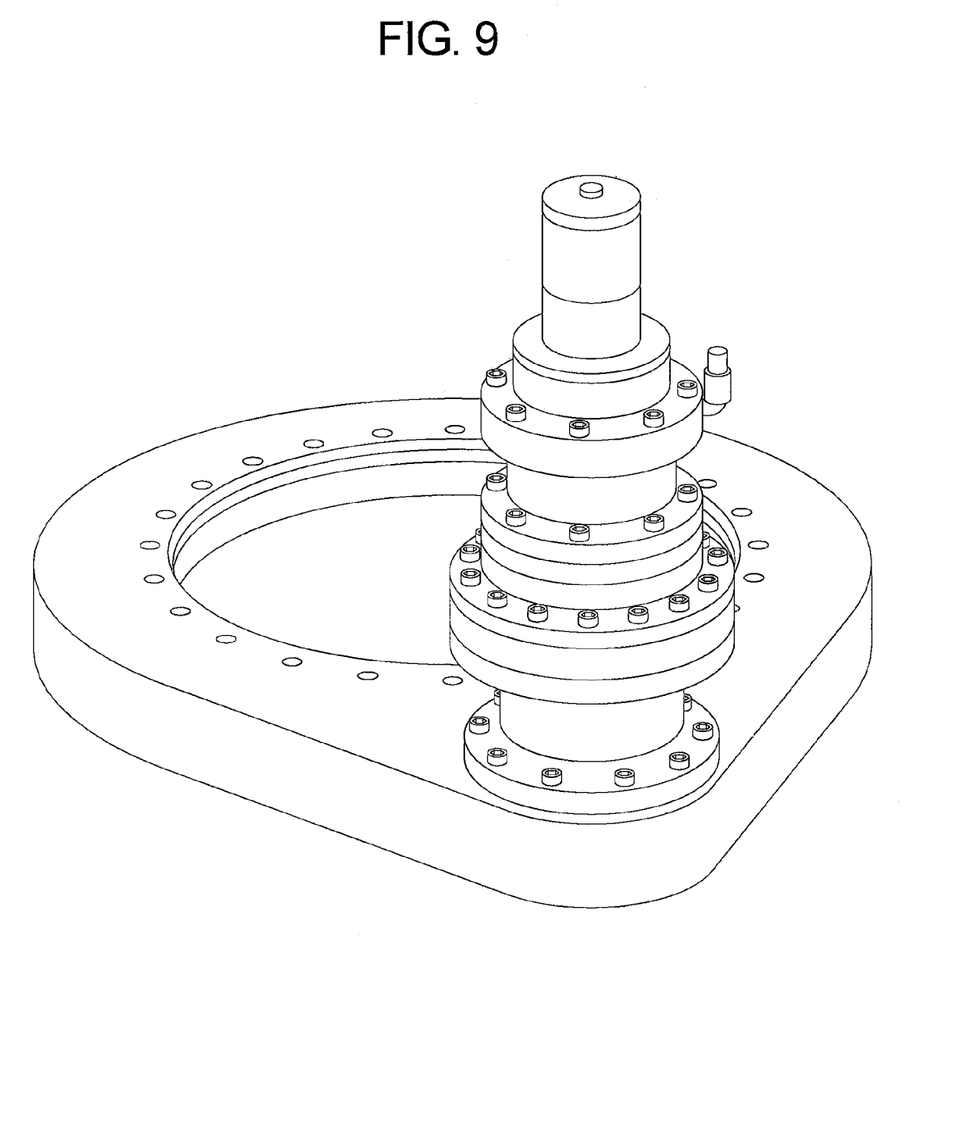
FIG. 9 is a perspective view of another gear-to-gear drive mechanism for pivoting the placer conveyor in a lateral direction.

Although the above illustrated example uses a worm gear driving mechanism, it should be appreciated that the gear mechanism may be a spur gear, a helical gear, a double helical gear, a bevel gear, or any suitable combination of different gears, provided that at least one gear delivers a sufficient torque to the gear that is fixedly mounted to the placer conveyor (see, for example, FIG. 9). Because the placer conveyor 110 includes a pivoting drive having a gear-to-gear connection, improved precision and placing accuracy can be achieved.

Referring back to FIGS. 1 and 2, in an embodiment, the placer conveyor includes a shield 154 or secondary conveyor mounted adjacent to the in-feed end 140 of the placer conveyor 110. In an embodiment, where the shield includes a conveyor belt, the conveyor belt (not shown) drives at substantially the same velocity and in the same direction as the placer conveyor belt 104 such that the material is conveyed between a region defined by the lower surface of the shield conveyor belt and the upper surface of the placer conveyor belt 172. In an alternate embodiment, the shield 154 may be unpowered and able to freely travel around a plurality of shield rollers 170. The region defined between the shield conveyor belt and the placer conveyor belt 172, in this example, is a substantially parallel area spaced apart and arranged to partially compress, settle, and/or shape the conveyed material. The shield 154 may further be removably mounted to the placer conveyor 110 and adjustable with respect to the placer conveyor 110 to accommodate different types of material.

In an embodiment, as illustrated in FIGS. 1 and 2, the placer conveyor 110 includes a drive axle (not shown) and drive roller 160 mounted thereon. In addition, the placer conveyor 110 includes at least one additional axle 198 and roller 180 combination that is located at the opposite end of the placer conveyor 110 from the drive axle and roller 160 (see, FIG. 1). The additional axle and roller 180 combination is essentially a passive roller. That is, it is not driven by the drive motor 162. Therefore, the two rollers 160 and 180 provide a path around which the placer conveyor belt 172 can be driven at a high velocity as the drive axle is rotated by the drive motor.

In an embodiment, the placer conveyor 110 includes a plurality of sets of placer conveyor rollers or troughing rollers 174 supporting the placer conveyor belt 172. The placer conveyor rollers 174 are mounted below the upper surface of the placer conveyor belt 172. At least some of the rollers 174 define axes oblique from the placer conveyor belt 172 such that the placer conveyor belt 172 forms a general trough-like or v-like shape. It should be appreciated that the rollers 174 may be of any suitable type, any suitable number, and may be oriented horizontally such that the placer conveyor belt 172 forms a flat profile. The troughing rollers 174 facilitate the conveyance of material from the in-feed end 140 of the placer conveyor 110 to the discharge end 144 of the placer conveyor 110. Several sets of troughing rollers 174 are arranged along the length of the placer conveyor 110 to help support the mass of the material. The placer conveyor belt 172 is configured to allow material to be conveyed when the placer conveyor 110 is in an inclined, horizontal, or declined position. In operation, the rollers 174 guide and facilitate the movement of material from the in-feed end 140 of the placer conveyor 110 to the discharge end 144 of the placer conveyor 110.

The placer conveyor belt 172 may be a fourteen inch wide two-ply belt, and/or may include one or more cleats (not shown) extending from and permanently mounted to the placer conveyor belt 104. However, it should be appreciated that the placer conveyor belt 172 may be any suitable dimension and made of any suitable material.

A deflector 182 may be optionally attached to the discharge end 144 of the placer conveyor 110 to further direct or deflect the conveyed material in a specific direction. In one example, the deflector 182 is arranged to deflect material projected from the discharge end 144 of the placer conveyor 110 immediately into the ground. This type of deflection would be appropriate in, for example, a roadside application where it is not necessary to project the material over a long distance. In another example, the deflector 182 is adjusted so deflect the material upward to discharge the material into the air. This may be appropriate in an application with limited access where the placing conveyor 110 may not be able to pivot vertically. It should be appreciated that the deflector 182 may be adjustable, removable, permanently fixed, and may be of any suitable type.

In one embodiment, the in-feed end 140 of the placer conveyor 110 is located substantially below the head roll 120 of the primary conveyor 108. Therefore, as the material is conveyed over the discharge edge of the primary conveyor 108, the material drops from the primary conveyor belt 116 onto the placer conveyor 110.

In one embodiment, the placer conveyor is operable to be rotated approximately one-hundred eighty degrees such that the placer conveyor is positioned adjacent to the primary hopper. In this example, the mobile placer is converted into a relatively compact unit that can be driven along a roadway.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A mobile material placer comprising:
a body;
a material hopper coupled to the body and configured to receive and store material;
a feeder conveyor coupled to the body, the feeder conveyor configured to receive material stored by the material hopper;
a placer conveyor pivotally coupled to the body about a substantially vertical axis and having an in-feed end and a discharge end, the in-feed end of the placer conveyor alignable with a discharge end of the feeder conveyor, the placer conveyor including a first drive mechanism configured to pivot the placer conveyor about the vertical axis, the first drive mechanism including a first gear and a second gear fixedly mounted to the placer conveyor, the first gear operatively coupled with the second gear to cause the placer conveyor to pivot about the vertical axis, the placer conveyor further including a conveyor belt; and
a second drive mechanism operatively coupled to the conveyor belt, the second drive mechanism and the conveyor belt configured such that in operation the conveyor belt is driven by the second drive mechanism at a linear velocity of at least 2,000 ft/min, the first gear and the second gear of the first drive mechanism enabling the placer conveyor to be held at a desired pivotal position about the vertical axis while being driven at the linear velocity of at least 2,000 ft/min such that a material is accurately thrown from the placer conveyor to a target site.

2. The mobile material placer according to claim 1, wherein the first gear is a worm screw and the second gear is a worm wheel.

3. The mobile material placer according to claim 2, wherein the worm screw rotates about a substantially horizontal axis and the worm wheel rotates about a substantially vertical axis.

4. The mobile material placer according to claim 1, wherein the worm screw is hydraulically driven.

5. The mobile material placer according to claim 1, wherein the worm screw is electrically driven.

6. The mobile material placer according to claim 1, wherein the second drive mechanism includes a high-speed hydraulic drive motor and is configured to rapidly dispense material to a worksite.

7. The mobile material placer according to claim 1, further including a remote control system configured to control at least the operation of the feeder conveyor, the speed of the placer conveyor, and the lateral pivoting of the placer conveyor.

8. The mobile material placer according to claim 1, including a cab connected to the body for direct control of at least the operation of the feeder conveyor, the speed of the placer conveyor, and the lateral pivoting of the placer conveyor.

9. The mobile material placer according to claim 1, wherein the second drive mechanism is capable of driving the conveyor belt at a linear velocity greater than 2,000 ft/min.

10. The mobile material placer according to claim 1, wherein the placer conveyor is also pivotally coupled to the body about a horizontal axis.

11. A mobile material placing apparatus comprising:
a body;
a material hopper coupled to the body and configured to receive and store material;
a feeder conveyor coupled to the body, the feeder conveyor configured to receive material stored by the material hopper;
a placer conveyor pivotally coupled to the body about a substantially vertical axis and having an in-feed end and a discharge end, the in-feed end of the placer conveyor alignable with a discharge end of the feeder conveyor, the placer conveyor including a first drive mechanism configured to pivot the placer conveyor about the vertical axis, the first drive mechanism including a worm screw and a worm wheel, the worm wheel fixedly mounted to the placer conveyor, and the worm screw operatively coupled with the worm wheel to cause the placer conveyor to swing back and forth, the placer conveyor further including a conveyor belt; and
a second drive mechanism operatively coupled to the conveyor belt, the second drive mechanism and the conveyor belt configured such that in operation the conveyor belt is driven by the second drive mechanism at a linear velocity of at least 2,000 ft/min, the worm screw and the worm wheel of the first drive mechanism enabling the placer conveyor to be held at a desired back and forth position while being driven at the linear velocity of at least 2,000 ft/min such that a material is accurately thrown from the placer conveyor to a target site.

12. The mobile material placer according to claim 11, wherein the worm screw rotates about a substantially horizontal axis and the worm wheel rotates about a substantially vertical axis.

13. The mobile material placer according to claim 11, wherein the worm screw is hydraulically driven.

14. The mobile material placer according to claim 11, wherein the worm screw is electrically driven.

15. The mobile material placer according to claim 11, wherein the second drive mechanism includes a high-speed hydraulic drive motor and is configured to eject material a distance of up to one-hundred feet.

16. The mobile material placer according to claim 11, further including a remote control system configured to control at least the operation of the feeder conveyor, the speed of the placer conveyor, and the lateral pivoting of the placer conveyor.

17. The mobile material placer according to claim 11, including a cab connected to the body for direct control of at least the operation of the feeder conveyor, the speed of the placer conveyor, and the lateral pivoting of the placer conveyor.

18. The mobile material placer according to claim 11, wherein the second drive mechanism is capable of driving the conveyor belt at a linear velocity greater than 2,000 ft/min.

* * * * *